United States Patent
Vu et al.

(10) Patent No.: US 12,210,830 B2
(45) Date of Patent: Jan. 28, 2025

(54) SYSTEM AND TECHNIQUES FOR HANDLING LONG TEXT FOR PRE-TRAINED LANGUAGE MODELS

(71) Applicant: Oracle International Corporation, Redwood Shores, CA (US)

(72) Inventors: Thanh Tien Vu, Herston (AU); Tuyen Quang Pham, Springvale (AU); Mark Edward Johnson, Sydney (AU); Thanh Long Duong, Seabrook (AU); Ying Xu, Melbourne (AU); Poorya Zaremoodi, Melbourne (AU); Omid Mohamad Nezami, Sydney (AU); Budhaditya Saha, Sydney (AU); Cong Duy Vu Hoang, Wantirna South (AU)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 17/750,240

(22) Filed: May 20, 2022

(65) Prior Publication Data
US 2023/0161963 A1 May 25, 2023

Related U.S. Application Data

(60) Provisional application No. 63/282,146, filed on Nov. 22, 2021.

(51) Int. Cl.
*G06F 40/30* (2020.01)
*G06F 40/169* (2020.01)
(Continued)

(52) U.S. Cl.
CPC .......... *G06F 40/295* (2020.01); *G06F 40/169* (2020.01); *G06F 40/284* (2020.01)

(58) Field of Classification Search
CPC ...... G06F 40/30; G06F 40/295; G06F 40/284; G06F 40/279; G06F 40/205; G06F 40/40;
(Continued)

(56) References Cited

U.S. PATENT DOCUMENTS 8,700,404 B1 * 4/2014 Chotimongkol ........ G10L 15/18
704/255
11,200,885 B1 * 12/2021 Mandal ................. G06F 40/279
(Continued)

FOREIGN PATENT DOCUMENTS

WO 2021202552 A1 10/2021

OTHER PUBLICATIONS

Bevan, et al., "Fine-tuning Transformers for Automatic Chemical Entity Identification in Pubmed Articles", Available Online at https://biocreative.bioinformatics.udel.edu/media/store/files/2021/TRACK2_pos_09_BC7_submission_135.pdf, 2021, 4 pages.
(Continued)

*Primary Examiner* — Jakieda R Jackson
(74) *Attorney, Agent, or Firm* — Kilpatrick Townsend & Stockton LLP

(57) ABSTRACT

In some aspects, a computing device may receive, at a data processing system, a set of utterances for training or inferencing with a named entity recognizer to assign a label to each token piece from the set of utterances. The computing device may determine a length of each utterance in the set and when the length of the utterance exceeds a pre-determined threshold of token pieces: dividing the utterance into a plurality of overlapping chunks of token pieces; assigning a label together with a confidence score for each token piece in a chunk; determining a final label and an associated confidence score for each chunk of token pieces by merging two confidence scores; determining a final annotated label for the utterance based at least on the merging the two
(Continued)

confidence scores; and storing the final annotated label in a memory.

20 Claims, 10 Drawing Sheets

(51) Int. Cl.
*G06F 40/284* (2020.01)
*G06F 40/295* (2020.01)

(58) Field of Classification Search
CPC .... G06F 16/3329; G06F 40/169; G06F 16/35; G06N 20/00; G06N 3/08; G10L 15/22; G10L 15/26; G10L 15/1822; G10L 15/063; G10L 15/16
See application file for complete search history.

(56) References Cited

U.S. PATENT DOCUMENTS

| | | | | |
|---|---|---|---|---|
| 11,222,165 | B1* | 1/2022 | Ramos | G06F 40/279 |
| 11,537,708 | B1* | 12/2022 | McTeggart | G06N 20/10 |
| 11,676,410 | B1* | 6/2023 | Sandu | G06V 30/416 |
| | | | | 382/156 |
| 11,823,671 | B1* | 11/2023 | Ramachandra | G06F 40/284 |
| 2005/0027664 | A1* | 2/2005 | Johnson | G06F 40/45 |
| | | | | 706/12 |
| 2006/0047690 | A1* | 3/2006 | Humphreys | G06F 40/295 |
| | | | | 707/999.102 |
| 2013/0311467 | A1* | 11/2013 | Galle | G06F 40/295 |
| | | | | 707/E17.046 |
| 2014/0358890 | A1* | 12/2014 | Chen | G06F 16/9535 |
| | | | | 707/710 |
| 2017/0358295 | A1* | 12/2017 | Roux | G06N 5/04 |
| 2018/0121415 | A1* | 5/2018 | Perez | G06F 16/367 |
| 2019/0179888 | A1* | 6/2019 | Saillet | G06N 5/025 |
| 2020/0126538 | A1* | 4/2020 | Han | G10L 15/063 |
| 2020/0193153 | A1* | 6/2020 | Lee | G06F 40/226 |
| 2020/0387675 | A1* | 12/2020 | Nugent | G06N 3/045 |
| 2021/0050015 | A1* | 2/2021 | Robichaud | G10L 25/78 |
| 2021/0174016 | A1* | 6/2021 | Fox | G06N 3/045 |
| 2021/0271870 | A1* | 9/2021 | Ni | G06V 10/82 |
| 2021/0374347 | A1* | 12/2021 | Yang | G06F 40/295 |
| 2021/0390127 | A1* | 12/2021 | Fox | G06F 40/289 |
| 2023/0009946 | A1* | 1/2023 | Rossiello | G06F 40/216 |
| 2023/0110803 | A1* | 4/2023 | Jerrard-Dunne | G06F 16/2228 |
| | | | | 707/747 |

OTHER PUBLICATIONS

Joshi , et al., "BERT for Coreference Resolution: Baselines and Analysis", Arxiv, Cornell University, Dec. 22, 2019, 6 pages.
International Application No. PCT/US2022/050024, "International Search Report and Written Opinion", Feb. 13, 2023, 12 pages.
Van Dongen , et al., "SChuBERT: Scholarly Document Chunks with BERT-encoding Boost Citation Count Prediction", Proceedings of the First Workshop on Scholarly Document Processing, Bernoulli Institute for Mathematics, Computer Science and Artificial Intelligence, Available Online at: https://arxiv.org/pdf/2012.11740.pdf, Nov. 19, 2020, pp. 148-157.
Zhang , et al., "NameRec*: Highly Accurate and Fine-grained Person Name Recognition", Arxiv.Org, Available Online at https://arxiv.org/pdf/2103.11360.pdf, Mar. 23, 2021, 16 pages.

* cited by examiner

Merging the predictions

| | living | in | Brisbane | , | Australia |
|---|---|---|---|---|---|
| | 6 | 7 | 8 | 9 | 10 |

From Chunk-A

| O | O | B-LOC | O | O |
|---|---|---|---|---|
Confidence scores: 0.9 0.9 0.9 0.9 0.5

From Chunk-B

| O | O | O | B-LOC |
|---|---|---|---|
Confidence scores: 0.9 0.5 0.9 0.9

Merged output

Half: O | O | B-LOC | O | B-LOC

First: O | O | B-LOC | O | B-LOC

Second: O | O | O | O | B-LOC

Max: O | O | B-LOC | O | B-LOC

*FIG. 6*

SYSTEM AND TECHNIQUES FOR HANDLING LONG TEXT FOR PRE-TRAINED LANGUAGE MODELS

CROSS-REFERENCES TO RELATED APPLICATIONS

This application claims priority to and incorporates by reference commonly-owned U.S. Patent Application Ser. No. 63/282,146, filed Nov. 22, 2021, entitled "System And Techniques For Handling Long Text For Pre-Trained Language Models," in its entirety and for all purposes.

FIELD OF THE INVENTION

The present disclosure relates generally to Chabot systems, and more particularly, to techniques for handling long text for pre-trained language models for Chabot systems in natural language processing.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Pre-trained language models used with natural language processing can be designed to support a maximum length of text. For example, for various models the maximum length of text can be limited to 512 token pieces (e.g., 512 subwords). In previous solutions, Chabot entries that exceeded the maximum length of text would be truncated to less than the maximum length of text. This solution could result in loss of information from the truncated data and less accurate results. This leads to the reduced performance of the Chatbot and poor customer experience.

BRIEF SUMMARY

Techniques disclosed herein relate generally to catboats. More specifically and without limitation, techniques disclosed herein relate to techniques for handling long text for pre-trained language model. In various aspects, pre-trained language models normally support a predetermined maximum number of token pieces. Long text can be divided into overlapping chunks with predefined chunk size and number of overlapping token pieces. The chunks can be tagged separately by the NER. The two scores of annotated labels for each overlapping token pieces (one from the first chunk and another from the second chunk) can be combined to determine the final label for each token piece in the long text. This can reduce the training and inferencing time while maintaining high performance of the Chabot.

In some aspects, a method includes: receiving, at a data processing system, a set of utterances for training or interfacing with a named entity recognizer to assign a label to each token piece from the one or more utterances; determining a length of the set of utterances; when the length of the set of utterances exceeds a pre-determined threshold of token pieces (i.e., the chunk size): dividing the set of utterances into a plurality of overlapping chunks of token pieces; assigning a label together with a confidence score for each token piece in a chunk; determining the final label and associated confidence score for the overlapping token pieces by merging the two confidence scores, one from the first chunk and another from the second chunk; determining the final annotated labels for the original textual input; and storing the labels in a memory.

In some aspects, each chunk and its corresponding sequence of labels are treated as a separate example when training and inferencing.

In some aspects, the dividing the set of utterances with a size N is broken into (N−L)/(K−L) overlapping chunks. Here, K is a chunk size and L is an overlapping size (K>L).

In some aspects, the determining the overall score and label of a token piece is based on a confidence score from the first selected chunk of the plurality of chunks.

In some aspects, the determining the overall score of a token piece is based on a position of the token piece in the overlapping text. The overlapping score is the first confidence score from the first chunk if it is in the first half of the overlapping text and the second confidence score from the second chuck if it is in the second half of the overlapping text.

In some aspects, the determining the overall score is based on a maximum confidence score of the plurality of chunks.

In some aspects, the predetermined number of token pieces (i.e., the chunk size) is 512 tokens and the predetermined number of overlapping tokens is 128. In some aspects, the predetermined number of token pieces is 32 and the predetermined number of overlapping tokens is 8.

In various aspects, a system is provided that includes one or more data processors and a non-transitory computer readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 6 illustrates techniques for merging the predictions.

DETAILED DESCRIPTION

Figure 1:
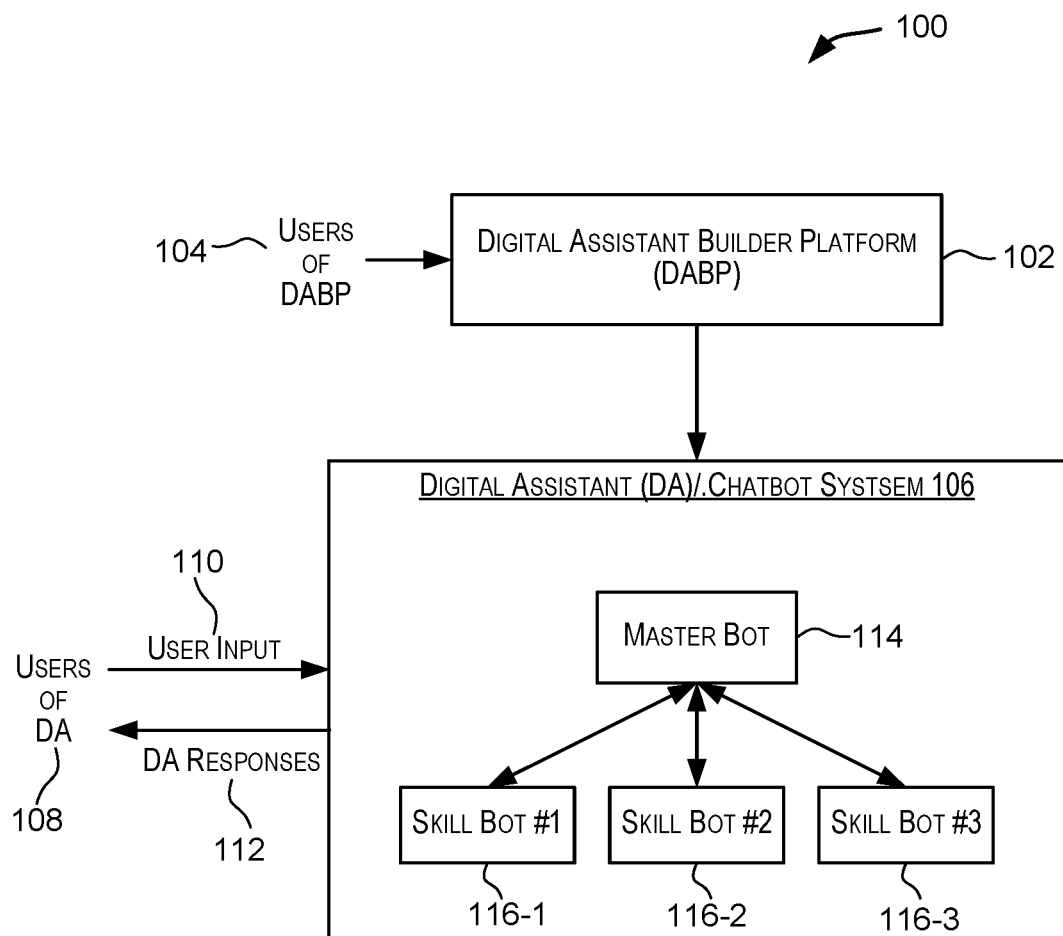
FIG. 1 is a simplified block diagram of an environment incorporating an exemplary embodiment of a Chabot system according to certain aspects.

In the following description, for the purposes of explanation, specific details are set forth in order to provide a thorough understanding of certain aspects. However, it will be apparent that various aspects may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other aspects or designs.

Bot and Analytic Systems

A bot (also referred to as a skill, Chabot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or Short Message Service (SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some aspects, the message may be different from a HTTP post call message. For example, the bot system may receive a message from a SMS. While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some aspects, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some aspects, the bot system may convert the content into a standardized form (e.g., a representational state transfer (REST) call against enterprise services with the proper parameters) and generate a natural language response. The bot system may also prompt the end user for additional input parameters or request other additional information. In some aspects, the bot system may also initiate communication with the end user, rather than passively responding to end user utterances. Described herein are various techniques for identifying an explicit invocation of a bot system and determining an input for the bot system being invoked. In certain aspects, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some aspects, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a Chabot to perform on behalf of the user. Therefore, utterances can be phrased as questions, commands, requests, and the like, that reflect the user's intent. An intent may include a goal that the end user would like to accomplish.

In the context of the configuration of a Chabot, the term "intent" is used herein to refer to configuration information for mapping a user's utterance to a specific task/action or category of task/action that the Chabot can perform. In order to distinguish between the intent of an utterance (i.e., a user intent) and the intent of a Chabot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the Chabot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a Chabot system according to certain aspects. Environment 100 comprises a digital assistant builder platform (DABP) 102 that enables users of DABP 102 to create and deploy digital assistants or Chabot systems. DABP 102 can be used to create one or more digital assistants (or DAs) or Chabot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a Chabot system. Accordingly, for purposes of this disclosure, the terms digital assistant and Chabot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs are generally in a natural language form and are referred to as utterances. A user utterance 110 can be in text form, such as when a user types in a sentence, a question, a text fragment, or even a single word and provides it as input to digital assistant 106. In some aspects, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some aspects, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some aspects, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain aspects, the NLU processing or portions thereof is performed by digital assistant 106 itself. In some other aspects, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain aspects, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or Chabot system generally contains or is associated with one or more skills. In certain aspects, these skills are individual catboats (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant 106 or Chabot system includes first skills bot 116-1, second skills bot 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or Chabot system. For example, in certain aspects, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and first skills bot 116-1, second skills bot 116-2, etc. that are child bots of master bot 114. In certain aspects, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain aspects, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain aspects, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and first skills bot 116-1, second skills bot 116-2, and third skills bot 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain aspects, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and the their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain aspects, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain aspects, a skill bot is trained based upon the intents configured for the skill bot and the example utterances associated with the intents (collectively, the training data), so that the skill bot can resolve user input utterances to one of its configured intents. In certain aspects, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain aspects, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain aspects, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain aspects, the dialog flow definition for a skill bot contains three sections:
 (a) a context section
 (b) a default transitions section
 (c) a state's section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain aspects, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain aspects, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain aspects, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain aspects, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
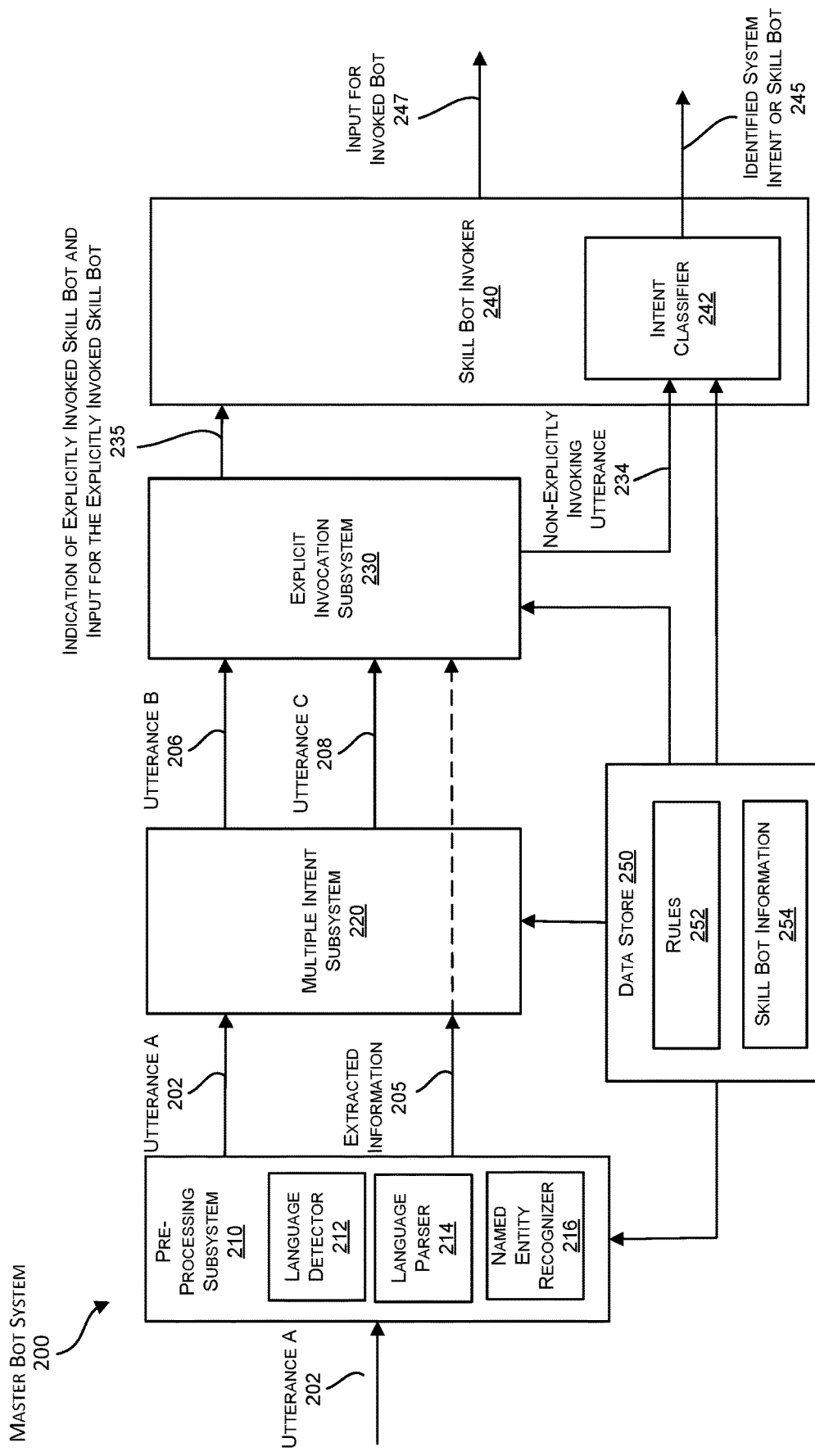
FIG. 2 is a simplified block diagram of a computing system implementing a master bot according to certain aspects.

FIG. 2 is a simplified block diagram of a master bot (MB) system 200 according to certain aspects. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some aspects, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself. The pre-processing system 210 can include a named entity recognizer 216 can be used to recognize certain utterances 202 or portions thereof.

As indicated above, the utterance 202 can include more than one sentence. For purposes of detecting multiple intents and explicit invocation, the utterance 202 can be treated as a single unit even if it includes multiple sentences. However, in certain aspects, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
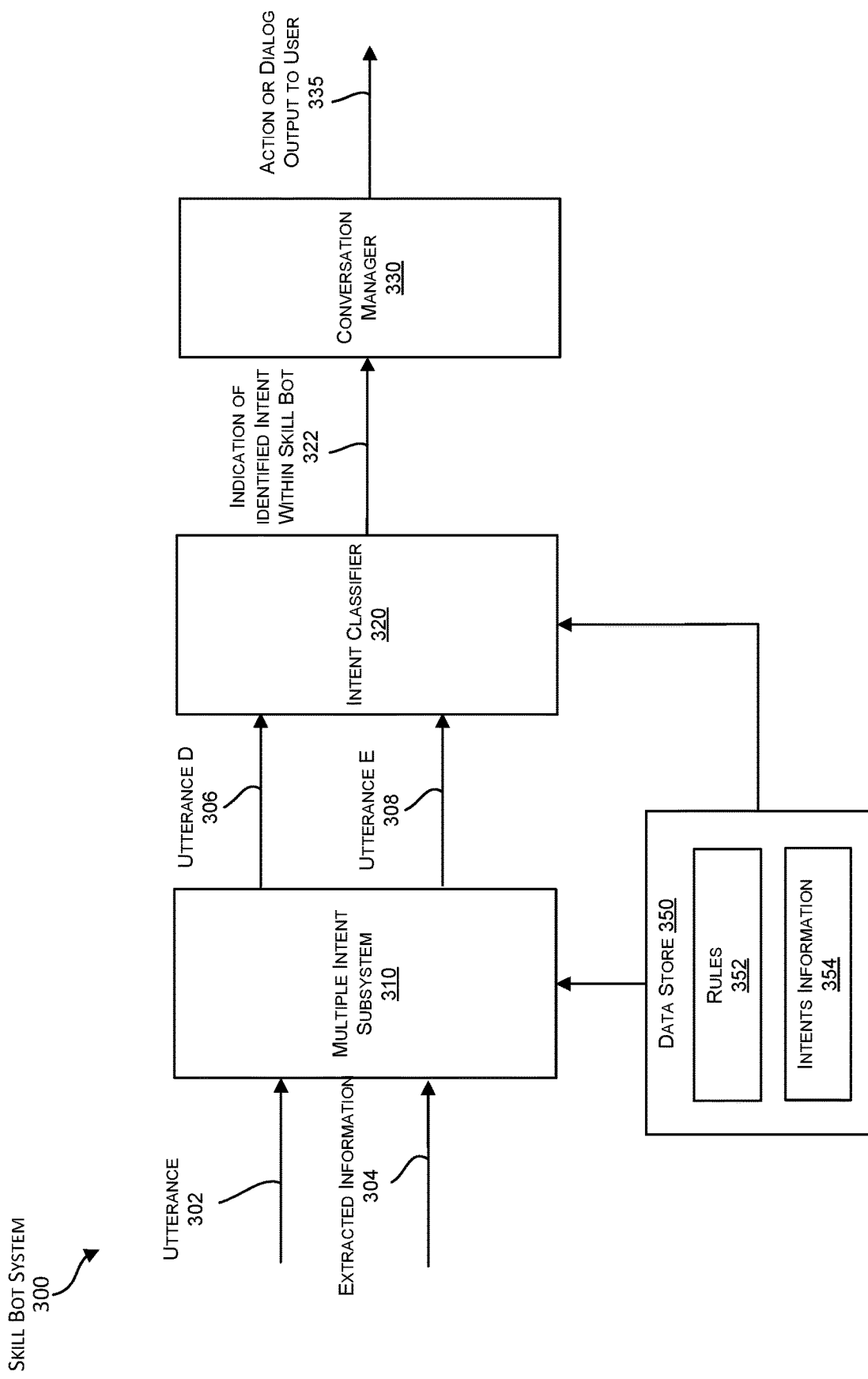
FIG. 3 is a simplified block diagram of a computing system implementing a skill bot according to certain aspects.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the Chabot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain aspects, each skill bot in a Chabot system is assigned a unique invocation name that distinguishes the skill bot from other skill bots in the Chabot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain aspects, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain aspects, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some aspects, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the Chabot system, e.g., a list of the invocation names of all skill bots registered with a particular master bot. The skill bot information 254 can also include information used by intent classifier 242 to determine a confidence score for each skill bot in the Chabot system, e.g., parameters of a machine-learning model.

FIG. 3 is a simplified block diagram of a skill bot system 300 according to certain aspects. Skill bot system 300 is a computing system that can be implemented in software only, hardware only, or a combination of hardware and software. In certain aspects such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain aspects, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain aspects, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain aspects, data store 350 can be integrated into a data store of a master bot or digital assistant, e.g., the data store 250 in FIG. 2.

A Chabot can perform the task of named entity recognition (NER). NER can refer to the task of finding spans of text that constitute proper name entities and tagging the type of the entity. Person, location, organization, and geo-political entities are the four popular named entities. The term "named entity", however, can refer to things like date, time, number, currency, etc. Here is an example of the output of our NER system:

[PERSON David Smith] paid [CURRENCY $95] on [DATE September 12th] at the [MERCHANT Palm Court Restaurant] in [LOCATION New York].

NER is a key NLP task that requires text analysis to understand relative semantics and sentiment. For example, knowing if a named entity like "Sydney" is a name of a place, a person, or a university is important to many natural language understanding tasks. Some of the important tasks that benefit from NER are described as follows. In question answering, NER can be used to identify the spans of text which constitutes answers. For example, the answer for the following question is "$95" based on the above example. How much did David Smith pay at the restaurant? In aspect-based sentiment analysis, NER can identify entities as an initial step to know the customer's sentiment towards the entities. For example, in the following sentence, there can be both positive and negative opinions about "Nikon camera" and "Canon camera" entities in the following example statement.

The Nikon camera is amazing; it is better than the Canon camera.

NER can be one of the technologies used in digital assistants. NER can be used in digital assistants to locate and classify the user's words into predefined categories like PER (which can be short for PERSON), DATE and TIME. These types of information can be used by the digital assistant to process the user's request. For example, to generate an expense report from the following sentence, a digital assistant can use an NER model to identify SFO, $10 and May 21st as MER (which can be short for MERCHANT), CUR (which can be short for CURRENCY) and DATE entities. LOC can be a category identifier short for LOCATION.

[MER SFO] charged [CUR $10] for parking on [DATE May 21st].

NER is a non-trivial task due to the difficulties caused by segmentation and type ambiguity. Segmentation ambiguity emerges from the complexity of finding the entities and their boundaries in the sentence. For example, multiple words in the sentence may represent one single entity. As demonstrated below, "New York Times" is a single entity (with MER tag) composed of 3 words:

Change this year's transaction amount for [MER New York Times] to $20.

Furthermore, same words can refer to multiple entity types and NER needs to resolve this type ambiguity according to the context. To illustrate, "Sydney" can refer to the person or location in the following sentences.

Late on Monday afternoon, [PER Sydney] texted us.

It's the best view in [LOC Sydney].

An understanding of classifiers can be useful in understanding how NER algorithms work. A classifier can be a system which learns a function to determine the class or label among a predefined finite set of categories given a set of inputs. As a common example of text classifier, sentiment analysis enables identifying the sentiment and orientation of an opinion expressed in a sentence (e.g., a review of a product) as being positive, negative, or neutral.

In comparison, sequence labelling classifies (i.e., assigns a label to) every word in a text; and NER as a sequence labelling task can include identifying and labelling subsequences of words. To do so, Begins, Inside, and Outside (BIO) label scheme can be a way of using a sequence labeler to identify subsequences, where labels capture both the boundary and the type of named entity. In this technique, any token that begins a span of interest can be tagged with the label B, tokens that occur inside a span are tagged with the Label I, and any tokens outside of any span of interest are labelled O. While there may be only one O tag, there can be different B and I tags for each named entity class (e.g., I-DATE and I-MER). The following example shows how BIO encoding defines the boundary between two adjacent named entities of the same type (i.e., [MER Plaza Hotel's] and [MER Palm Court Restaurant]). Table 1 illustrates an example categorization of an utterance.

TABLE 1

| TEXT: | BIOTAG(s): |
|---|---|
| David | B-PER |
| Smith | I-PER |
| paid | O |
| $95 | B-CUR |
| on | O |
| Sep | B-DATE |
| 12th | I-DATE |
| at | O |
| the | O |
| Plaza | B-MER |
| Hotel's | I-MER |
| Palm | B-MER |
| Court | I-MER |
| Restaurant | I-MER |
| in | O |
| New | B-LOC |
| York | I-LOC |

An intelligent assistant NER can incorporate the following state-of-the-art technologies.

Deep learning refers to neural networks composed of multiple processing layers which learn different levels of data representations automatically. Each layer learns to transform its input data into slightly more abstract and complex representation so that it enables feature learning and removes the need of rich hand-crafted features. For this reason, deep neural networks can be the right tool for solving complex problems that offer sufficient data. Discovering intricate structure in large datasets and integrating longer range information in the input, deep learning has significantly improved the state-of-the-art in natural language processing including NER task.

Pre-training refers to the process of training a network on large external datasets such as Wikipedia and Common Crawl (an open repository of freely provided data by crawling the web). The intuition behind pre-training is that if a network is trained on a large and general enough dataset, it will be effectively served as a generic model of the textual world. Using pre-trained networks, we can exploit the knowledge gained while solving one problem (e.g., language modeling) to initialize the backbones of a new network for solving a different but related problem (e.g., text classification) without having to start from scratch (a.k.a., transfer learning).

Sequence labelling models (e.g., NER) can lead to inconsistency between neighboring labels. For example, in the following sentence, the model has labelled "Sydney" as B-PER and "Harbour" as I-LOC which is not a valid sequence since the label boundary cannot start with an I tag. So, the correct sequence will be B-LOC and I-LOC. For this reason, conditional random field (CRF) is used to enforce that adjacent labels are consistent. Table 3 illustrates an exemplary labeling of a portion of a sentence.

TABLE 2

| Text: | I | walked | over | the | Sydney | Harbour | Bridge |
|---|---|---|---|---|---|---|---|
| BIO Tags: | O | O | O | O | B-LOC | I-LOC | I-LOC |

To do so, CRF learns tag-tag weights while training and avoids generating impossible BIO tag sequences by assigning those sequences a very negative weight (e.g., X values in the following Table 3).

TABLE 3

|  | O | B-LOC | B-PER | I-LOC | I-PER |
|---|---|---|---|---|---|
| O |  |  |  | X | X |
| B-LOC |  |  |  |  | X |
| B-PER |  |  |  | X |  |
| I-LOC |  |  |  |  | X |
| I-PER |  |  |  | X |  |

Deep learning models with a large number of parameters can easily be overfit to the training data. This has the effect of the model learning the noise in the training data which results in poor performance when the model is evaluated on new data. Dropout can be a computationally cheap and remarkably effective technique for addressing this problem. The key idea is to randomly ignore or drop out some layer output units from the model during training to prevent units from co-adapting too much (i.e., overfitting).

Deep learning models require different constraints and capacities to generalize well on different data patterns. These constraints are controlled by a number of measures called hyper-parameters which have to be tuned so that the model can optimally solve the problem. Hyper-parameter tuning refers to the process of finding a set of optimal hyper-parameters for a learning algorithm.

The disclosed NER system can include several model improvements, training improvements, and data improvements.

For model improvements, the disclosed NER system can combine the context and gazetteer features. The disclosed NER model can be a hybrid model combining the context and gazetteer features. The new method combines contextual features and external knowledge resources called gazetteers to improve the model performance. Gazetteers can be lists of named entities such as organizations, countries, cities, and person names which are matched against unstructured text to provide additional features to the model. For example:

TABLE 4

| Value | Entity Type |
|---|---|
| Baton Rouge | Merchant |
| Burgerville | Merchant |
| Ramen Street | Merchant |
| Slim Chickens | Merchant |
| Ribs & Burgers | Merchant |
| Pizza Hut | Merchant |
| Max & Erma's | Merchant |

By leveraging external knowledge makes the disclosed NER model less dependent on annotated data which can be extremely expensive and laborious to collect.

The disclosed NER system can include a fixed CRF tag-tag transitions on small training datasets. On large training datasets, CRF learns that inconsistent tag pairs like O I-LOC I-PER never appear in the training data, and hence assigns these tag-tag transitions a very negative weight. However, on small training datasets, CRF sometimes learns a model that generates these inconsistent tag-tag transitions. Therefore, the disclosed NER system can introduce a new technique to stop CRF from finding the inconsistent tag-tag transitions by modifying the corresponding weights after training by setting the weights for the inconsistent transitions to a very negative value. This technique guarantees generating consistent tag-tag transitions even with small training data.

For improved training, the disclosed NER system can include selective dropout. A new technique called selective dropout can apply a higher dropout rate to entity tokens compared to non-entity tokens. This can force the model to focus on the contextual information during training and makes the model more reliable and robust to different values for every entity type. For example: (The blue parts are entity values.)

Training example: Transfer $100 to my saving account please.
Test example: Would you please transfer £250 to my banking account?

The disclosed NER system can include extensive hyper-parameter tuning. The hyper-tuning framework can cover a wide ranges of values. This enables the disclosed NER system to run extensive hyper-parameter tuning to identify an optimal choice of hyper-parameters for achieving high-quality results.

The disclosed NER system can include data improvements. One data improvement can include overlapping chunking mechanism. A limitation of existing state-of-the-art models is that their memory and computational requirements grow quadratically with the input sequence length. Given the limitations of commonly available hardware, the current pretrained language models can only process input sequences of maximum 512 tokens. To mitigate this limitation, the disclosed system can use a mechanism to break a long text into overlapping chunks, where each chunk and its corresponding labels are treated as a separate example when training. For evaluation/inference, we have to merge the predictions from chunks from the same input text. This mechanism enables the model to serve larger sequences and significantly reduces the training and inference time while maintaining high performance.

Figure 4:
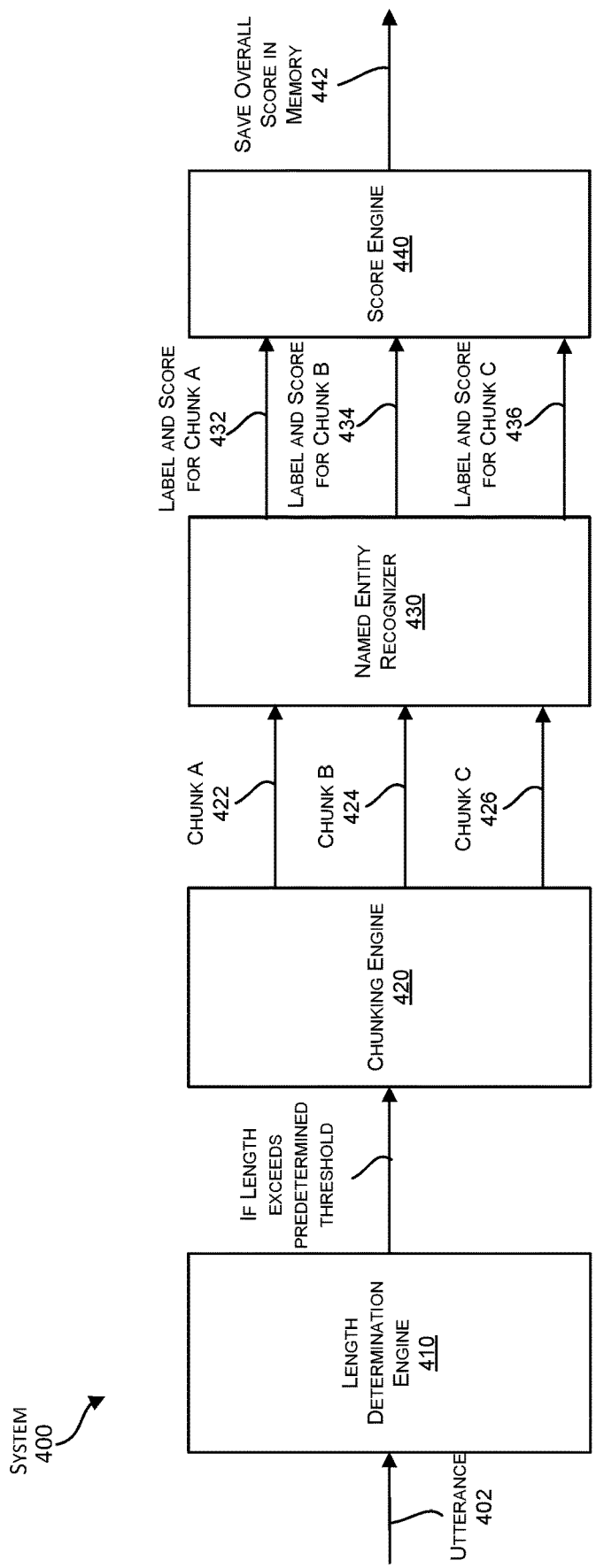
FIG. 4 illustrates a system for handling long text for pre-trained language models.

FIG. 4 illustrates a system 400 for handling long text for pre-trained language models. The length determination engine 410 can receive the utterance 402. The length determination engine can determine if the length exceeds a predetermined threshold of tokens. Tokens can be a word, a portion of a word, or punctuation.

If the length exceeds the predetermined threshold of token pieces the chunking engine 420 can break the utterance into a plurality of overlapping chunks. For example, the chunking engine 420 can divide utterance 402 into Chunk-A 422, Chunk-B 424, and Chunk-C 426. While three chunks are illustrated, the disclosed techniques are not so limited and are applicable to any number of chunks. For example, as few as two chunks can be processed depending on the processing system capabilities.

The named entity recognizer 430 can determine a classifier or label for each of the chunks. For example, the named entity recognizer 430 can determine label-A 432 for Chunk-A 422, label-B 434 for Chunk-B 424, and label-C 436 for Chunk-C 426. As discussed above, named entity recognizer 430 can assign a label to each token in a chunk. The named entity recognizer can also assign a label to each chunk of the plurality of chunks. The score engine 440 can receive label-A 432 for Chunk-A 422, label-B 434 for Chunk-B 424, and label-C 436 for Chunk-C 426. Each of the labels can have an accompanying chunk score. The Score Engine 440 can calculate a final label and an associated confidence score for each chunk of the overlapping chunks of token pieces by merging two confidence scores, one from a first chunk and another from a second chunk. The Score Engine 440 can determine a final annotated label for the set of utterances based at least on the merging the two confidence scores. The Score Engine 440 can store the final annotated score 442 in a memory.

Figure 5:
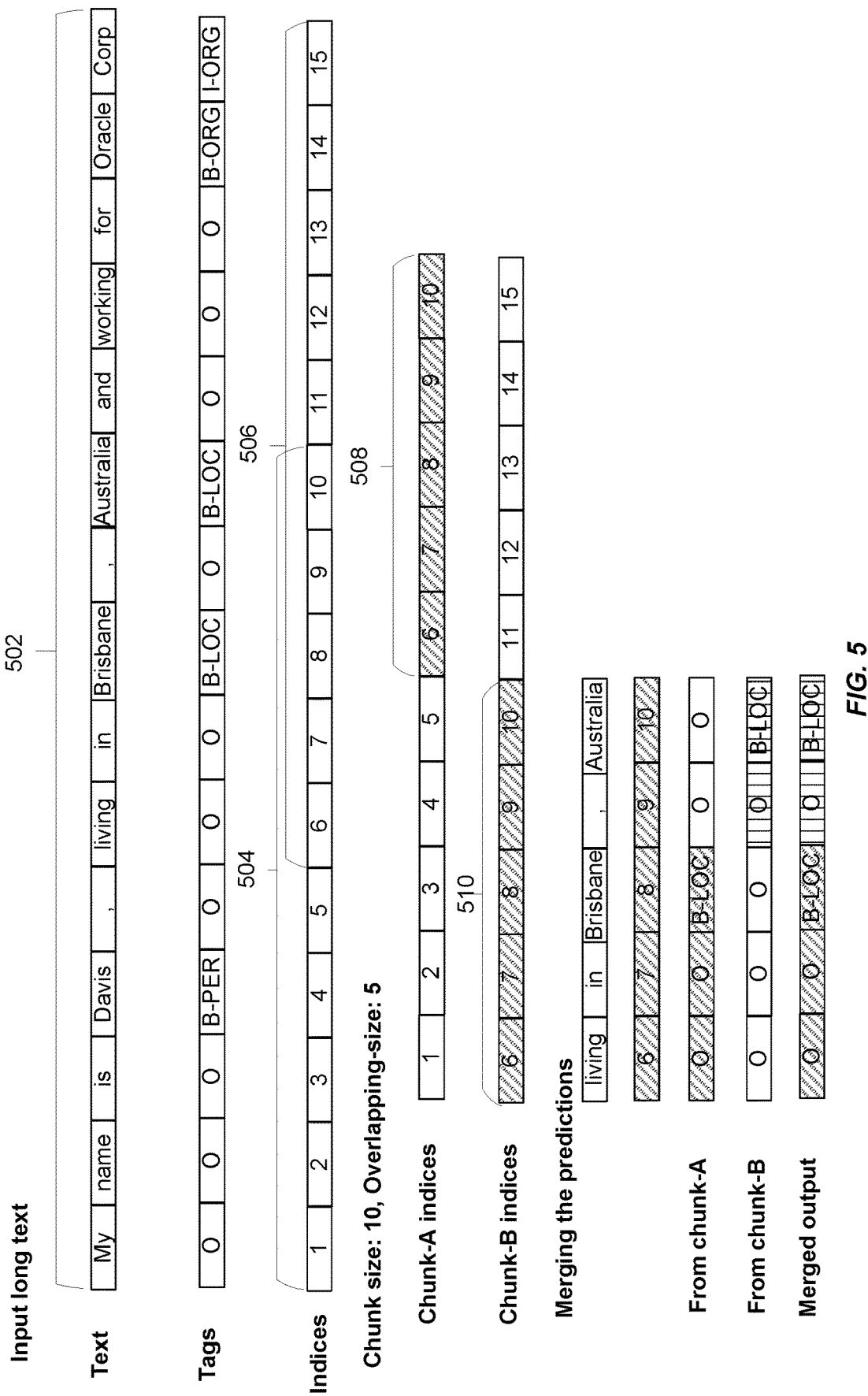
FIG. 5 illustrates converting an exemplary utterance into a plurality of chunks.

FIG. 5 illustrates converting an exemplary utterance 502 into a plurality of chunks. The example utterance 502 can be divided into a plurality of chunks, wherein each chunk is a certain number of words. As shown in FIG. 5, the example utterance 502 can be divided into segments of pre-determined lengths including a number of words. In some aspects, the pre-determined length can be 32 words. As an example, utterance 502 can be divided into Chunk-A 504 can include indices 1 through 10 for an exemplary chunk size of 10 tokens. Chunk-B can include indices 6 through 15 for an exemplary chunk size of 10 tokens. The named entity recognizer 430, as shown in FIG. 4, can process smaller chunks more efficiently. For example, it will be faster for the entity recognizer 430 to process the 10 word segments than it would be to process the entire example utterance 502.

The named entity recognizer 430 can analyze the utterance 502 and determine a tag or label for each of the tokens. For example, the first token of the utterance 502, at index 1, is the word "My" and the named entity recognizer 430 can assign the token the tag of "0" which means that it is outside of the range of interest. Similarly, the named entity recognizer 430 can assign the tokens, "name" "is" "," "living" "in" "and" "working" "for" can be assigned a tag of "0". The named entity recognizer 430 can assign the token "Davis" at index 4 a tag of "B-PER" meaning that is the beginning of a person's name. The named entity recognizer 430 can assign the token "Brisbane" at index 8 a tag of "B-LOC" meaning beginning of a location. The named entity recognizer 430 can assign the token "Australia" at index 10 the tag of "B-LOC" meaning beginning of a location. The named entity recognizer 430 can assign the token "Oracle" at index 14 the tag of "B-ORG" meaning the beginning of an organization. The named entity recognizer 430 can assign the token "Corp" at index 15 the tag of inside the span of an organization name.

As an example, FIG. 5 illustrates a chunk size of 10 tokens with an overlapping size of 5 chunks. For example, a first overlap portion 508 can include the second half of Chunk-A 504. A second overlap portion 510 can include the first half of Chunk-B 506.

FIG. 5 further illustrates techniques for merging predictions from the chunks. For example, the named entity recognizer 430 can properly label "Brisbane" at index 8 but misses "Australia" at index 10 during analysis of Chunk-A. During analysis of Chunk-B, the named entity recognizer 430 can properly label "Australia" at index 10 but missed "Brisbane" at index 8. When the outputs of analysis from Chunk-A and Chunk-B are merged, but "Brisbane" and "Australia" and be properly labelled.

FIG. 6 illustrates techniques for merging the predictions. The Score Engine 440 as shown in FIG. 4 can determine a confidence score for each of the labels from the named entity recognizer 430. For example, the Score Engine 440 can determine a confidence score for indices 6, 7, 8, and 9, the confidence score indicates that the confidence in the assigned labels being 0.9 representing a 90% confidence that the label is correct. For index 10 for Chunk-A, the Score Engine 440 can determine a confidence score for the assigned label of "0" being 0.5 representing a 50% confidence that the label is correct.

For Chunk-B, the Score Engine 440 can determine a confidence score for indices 6, 7, 9, and 10, the confidence score indicates that the confidence in the assigned labels being 0.9 representing a 90% confidence that the label is correct. For index 8 for Chunk-B, the Score Engine 440 can determine a confidence score for the assigned level of "0" being 0.5 representing a 50% confidence that the label is correct.

For the merged output there can be several possible outcomes. For example, the output strategies can include "half," "first," "second," and "max." For "half" strategy, the Score Engine 440 can use ½ prediction from the first chunk and ½ prediction from the second chunk. For the "first" strategy, the Score Engine 440 can use the prediction from the first chunk. For the "second" strategy, the Score Engine 440 can use the prediction from the second chunk. For the "max" strategy, the Score Engine 440 can decide on the prediction based on the maximum confidence scores.

As shown in FIG. 6, the "half" strategy can provide an accurate result because the labels for index 8 for "Brisbane" and label index 10 for "Australia" are both accurate. The "first" strategy correctly identifies the label for index 8 for "Brisbane" but incorrectly labels the token piece for "Australia". The "second" strategy incorrectly identifies the label for index 8 for "Brisbane" but correctly labels the token piece for "Australia." The "Max" strategy can provide an accurate result because the labels for index 8 for "Brisbane" and label index 10 for "Australia" are both accurate.

In some aspects, the pre-determined length can be 32 token pieces. As shown in FIG. 6, each of the chunks can be broken up into multiple elements. For example, each of the chunks can provide overlap, which can be abbreviated as l, between the chunks. The amount of overlap between the chunks can be predetermined. In an example, for a 32 token piece chunk the overlap can be 16 token pieces (subwords).

Figure 7:
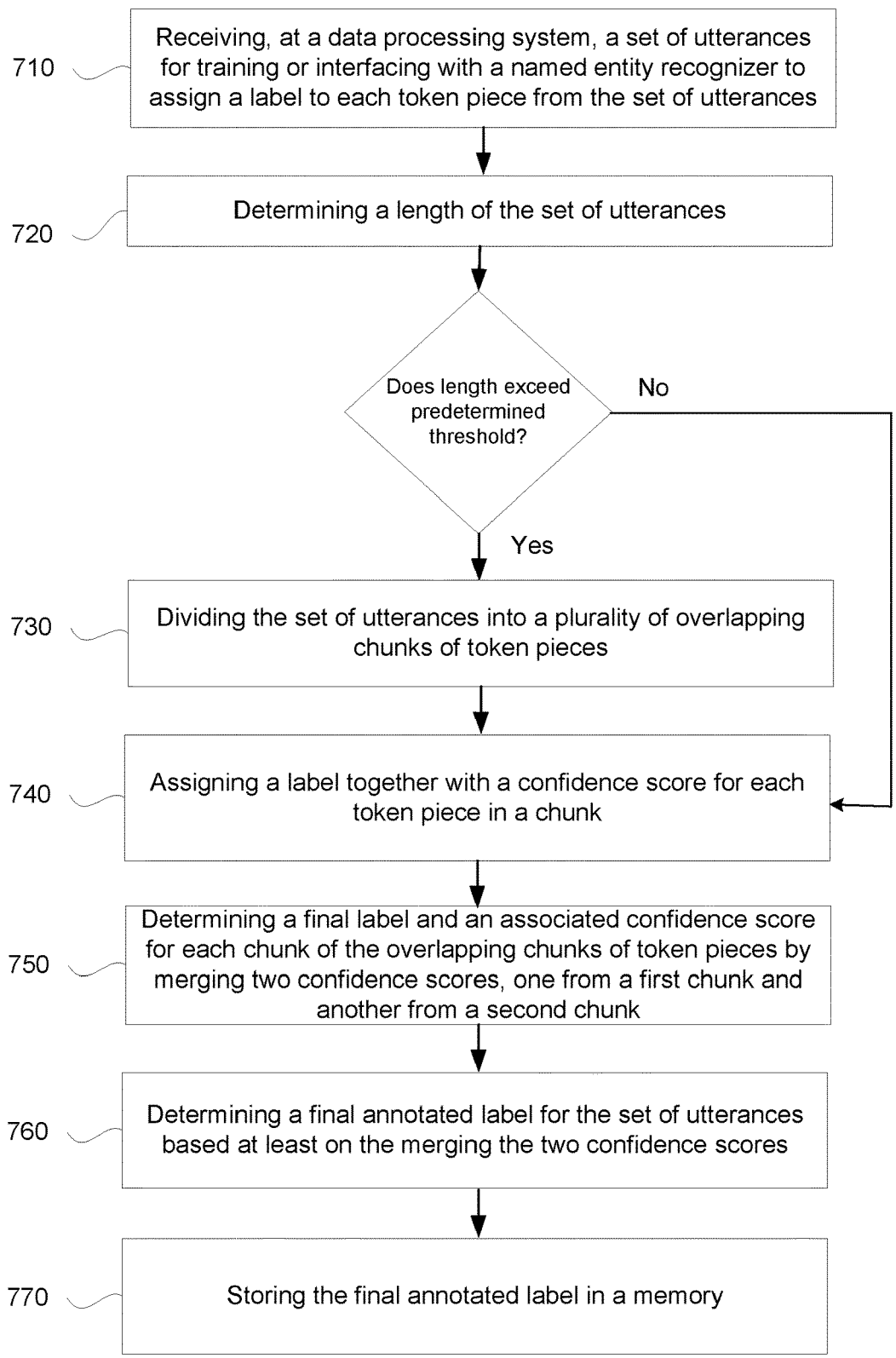
FIG. 7 is a flow diagram for a technique for handling long text for pre-trained language models.

FIG. 7 is a flowchart of an example process 700 associated with system and techniques for handling long text for pre-trained language models. In some implementations, one or more process blocks of FIG. 7 may be performed by a computing device (e.g., computing device 1000). In some implementations, one or more process blocks of FIG. 7 may be performed by another device or a group of devices separate from or including the computing device. Additionally, or alternatively, one or more process blocks of FIG. 7 may be performed by one or more components of device 1000, such as processing subsystem 1004, storage subsystem 1018, I/O subsystem 1008, communication subsystem 1024, and/or bus subsystem 1002.

As shown in FIG. 7, process 700 may include receiving, at a data processing system, a set of utterances for training or interfacing with a named entity recognizer to assign a label to each token piece from the set of utterances (block 710). For example, the computing device may receive, at a data processing system, a set of utterances for training or interfacing with a named entity recognizer to assign a label to each token piece from the set of utterances, as described above. In various aspects, the set of utterances can be received through user entry via a Chabot using a keyboard. In various aspects, the set of utterances can be received though user via a Chabot aurally using a microphone. The system can convert the verbal utterance into a textual entry.

As further shown in FIG. 7, process 700 may include determining a length of the set of utterances (block 720). For example, the computing device may determine a length of the set of utterances, as described above. The process 700 can determined the length of the set of utterances by dividing the utterance into a plurality of token pieces. A token piece can be a word, a portion of a word, or punctuation. Complex words can be broken down into one or more token pieces. The length can be the number of token pieces in the utterance.

As further shown in FIG. 7, process 700 may include when the length of the set of utterances exceeds a pre-determined threshold of token pieces, the process 700 can include dividing the set of utterances into a plurality of overlapping chunks of token pieces (block 730). The length of the utterance can be compared with a predetermined threshold. The pre-determined threshold can vary as required. In various aspects, the pre-determined threshold can be 512 token pieces. One skilled in the art would understand that other thresholds would be within the scope of the disclosure.

As further shown in FIG. 7, process 700 may include assigning a label together with a confidence score for each token piece in a chunk (block 740). As described above, each of the token pieces in an utterance can be assigned a label. The named entity recognizer 430 can identify and label subsequences of words. In various aspects, a begins, inside, and outside (BIO) label scheme can used. The BIO label scheme can identify subsequences, where labels capture both the boundary and the type of named entity. In this technique, any token that begins a span of interest can be tagged with the label B, tokens that occur inside a span are tagged with the label I, and any tokens outside of any span of interest are labelled O. While there may be only one O tag, there can be different B and I tags for each named entity class (e.g., I-DATE and I-MERCHANT). Each label can be assigned a confidence score that indicates that confidence that the label is correct.

As further shown in FIG. 7, process 700 may include determining a final label and an associated confidence score for each chunk of the overlapping chunks of token pieces by merging two confidence scores, one from a first chunk and another from a second chunk (block 750).

As further shown in FIG. 7, process 700 may include determining a final annotated label for the set of utterances based at least on the merging the two confidence scores (block 760).

As further shown in FIG. 7, process 700 may include storing the final annotated label in a memory (block 770). Process 700 can utilize several different strategies for determining a final annotated label. For example, the output strategies can include "half," "first," "second," and "max." For "half" strategy, the Score Engine 440 can use ½ prediction from the first chunk and ½ prediction from the second chunk. For the "first" strategy, the Score Engine 440 can use the prediction from the first chunk. For the "second" strategy, the Score Engine 440 can use the prediction from the second chunk. For the "max" strategy, the Score Engine 440 can decide on the prediction based on the maximum confidence scores.

Process 700 may include additional implementations, such as any single implementation or any combination of implementations described below and/or in connection with one or more other processes described elsewhere herein.

In a first implementation, each chunk and its corresponding sequence of labels are treated as a separate example when training.

In a second implementation, alone or in combination with the first implementation, the utterance with the length N is broken into $[(N-L)/(K-L)]$ overlapping chunks wherein K is a chunk size and L is an overlapping size.

In a third implementation, alone or in combination with one or more of the first and second implementations, the determining an overall score and final annotated label of a token piece based at least in part on a confidence score from a first selected chunk of the plurality of overlapping chunks.

In a fourth implementation, alone or in combination with one or more of the first through third implementations, the determining an overall score of a token piece is based on a position of the token piece in the overlapping chunks of token pieces, wherein the overall score is a first confidence score from the first chunk if it is in a first half of in the overlapping chunks of token pieces and a second confidence score from the second chunk if it is in a second half of the overlapping chunks of token pieces.

In a fifth implementation, alone or in combination with one or more of the first through fourth implementations, the determining an overall score is based on a maximum confidence score of the plurality of overlapping chunks.

In a sixth implementation, alone or in combination with one or more of the first through fifth implementations, the pre-determined threshold of token pieces is 512 token pieces and a pre-determined number of overlapping token pieces is 128 token pieces.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
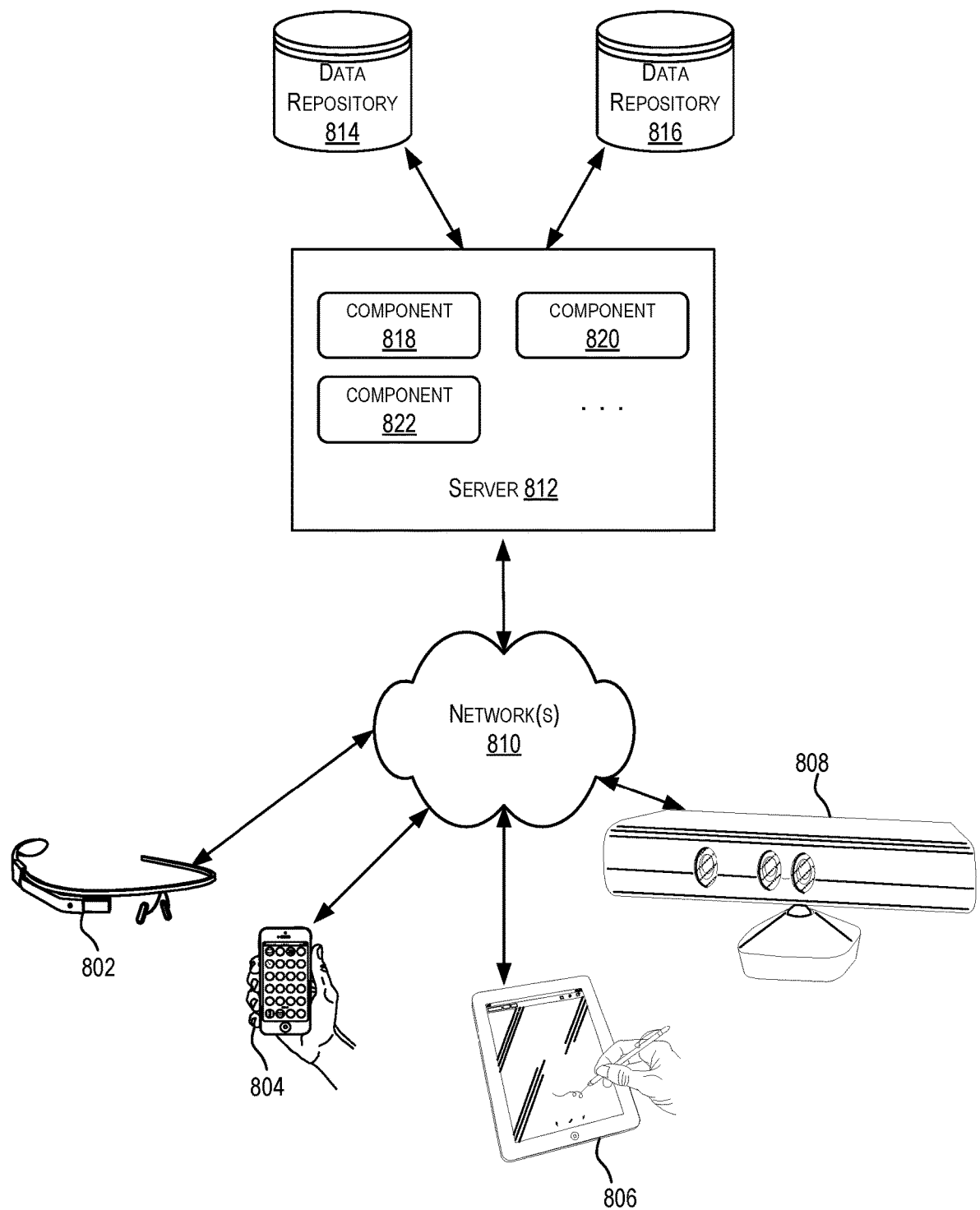
FIG. 8 depicts a simplified diagram of a distributed system for implementing certain aspects.

FIG. 8 depicts a simplified diagram of a distributed system 800 for implementing an embodiment. In the illustrated embodiment, distributed system 800 includes one or more client computing devices 802, 804, 806, and 808, coupled to a server 812 via one or more communication networks 810. Clients computing devices 802, 804, 806, and 808 may be configured to execute one or more applications.

In various aspects, server 812 may be adapted to run one or more services or software applications that enable techniques for handling long text for pre-trained language models.

In certain aspects, server 812 may also provide other services or software applications that can include non-virtual and virtual environments. In some aspects, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, and/or 808 for techniques for handling long text for pre-trained language models in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®)), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that can support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 810 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization such as one or more flexible pools of logical storage devices that can be virtualized to maintain virtual storage devices for the server. In various aspects, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain aspects. For example, one or more of the data repositories 814, 816 may be used to store information for techniques for handling long text for pre-trained language models (e.g., intent score, overall score). Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain aspects, a data repository used by server 812 may be a database, for example, a relational database, such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 814, 816 may also be used by applications to store application data. The data repositories used by applications may be of different types such as, for example, a key-value store repository, an object store repository, or a general storage repository supported by a file system.

In certain aspects, the techniques for handling long text for pre-trained language models functionalities described in this disclosure may be offered as services via a cloud environment. FIG. 6 is a simplified block diagram of a cloud-based system environment in which various text handling-related services may be offered as cloud services, in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 812. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

Figure 9:
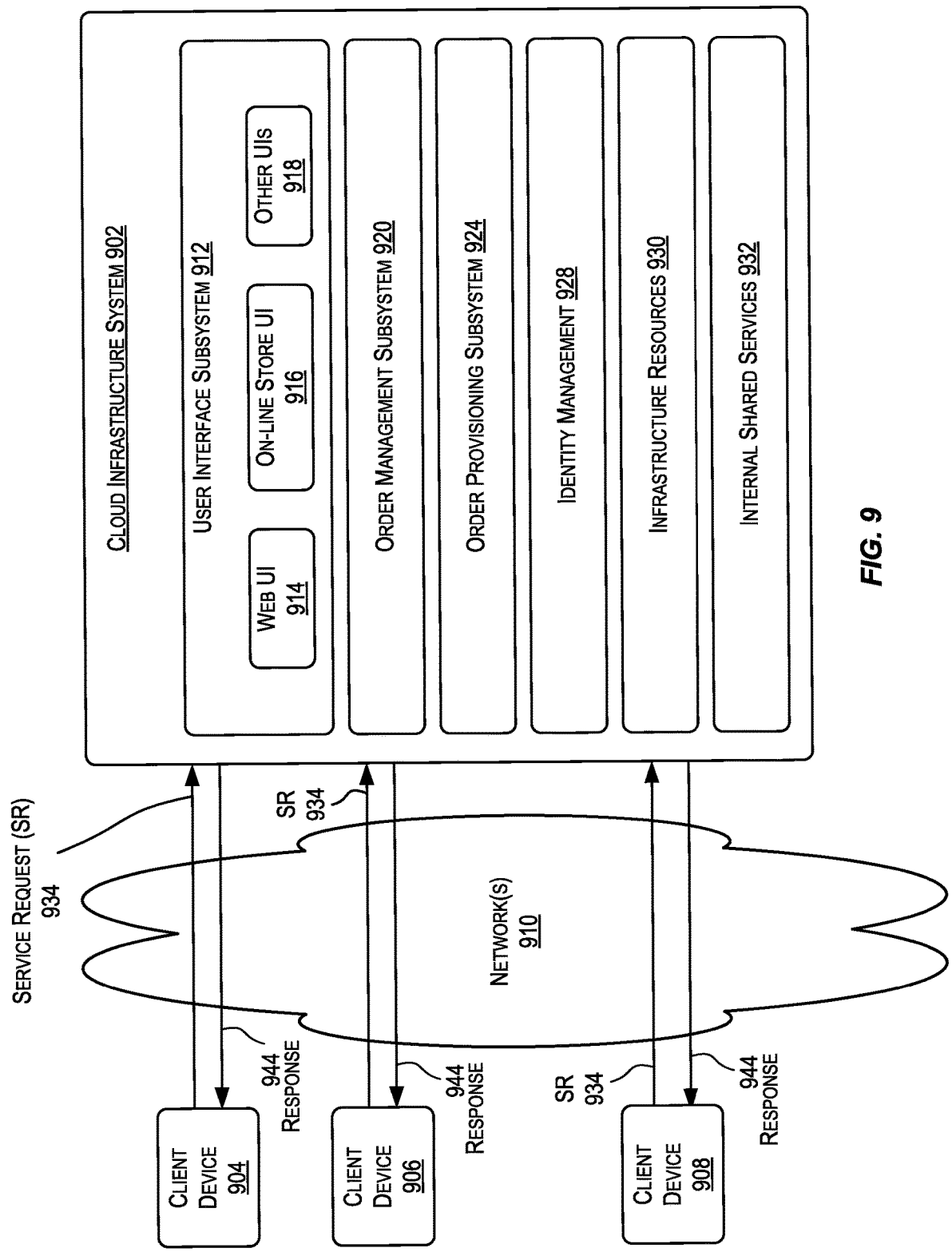
FIG. 9 is a simplified block diagram of one or more components of a system environment by which services provided by one or more components of an embodiment system may be offered as cloud services, in accordance with certain aspects.

The embodiment depicted in FIG. 9 is only one example of a cloud infrastructure system and is not intended to be limiting. It should be appreciated that, in some other aspects, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative aspects.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via a network 910 (e.g., the Internet), on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain aspects, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer can be an individual or an enterprise. In certain other aspects, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other aspects, under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 802, 804, 806, and 808 depicted in FIG. 8) and may be capable of operating one or more client applications. A user may use a client device to interact with cloud infrastructure system 902, such as to request a service provided by cloud infrastructure system 902. For example, a user may use a client device to request a chat bot service described in this disclosure.

In some aspects, the processing performed by cloud infrastructure system 902 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 902 for determining the intent of an utterance. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like.

In certain aspects, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for a Chabot related service offered by cloud infrastructure system 902. As part of the order, the customer may provide information identifying for input (e.g., utterances).

In certain aspects, such as the embodiment depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain aspects, cloud infrastructure system 902 comprises an identity management subsystem (IMS) 928 that is configured to manage customers information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
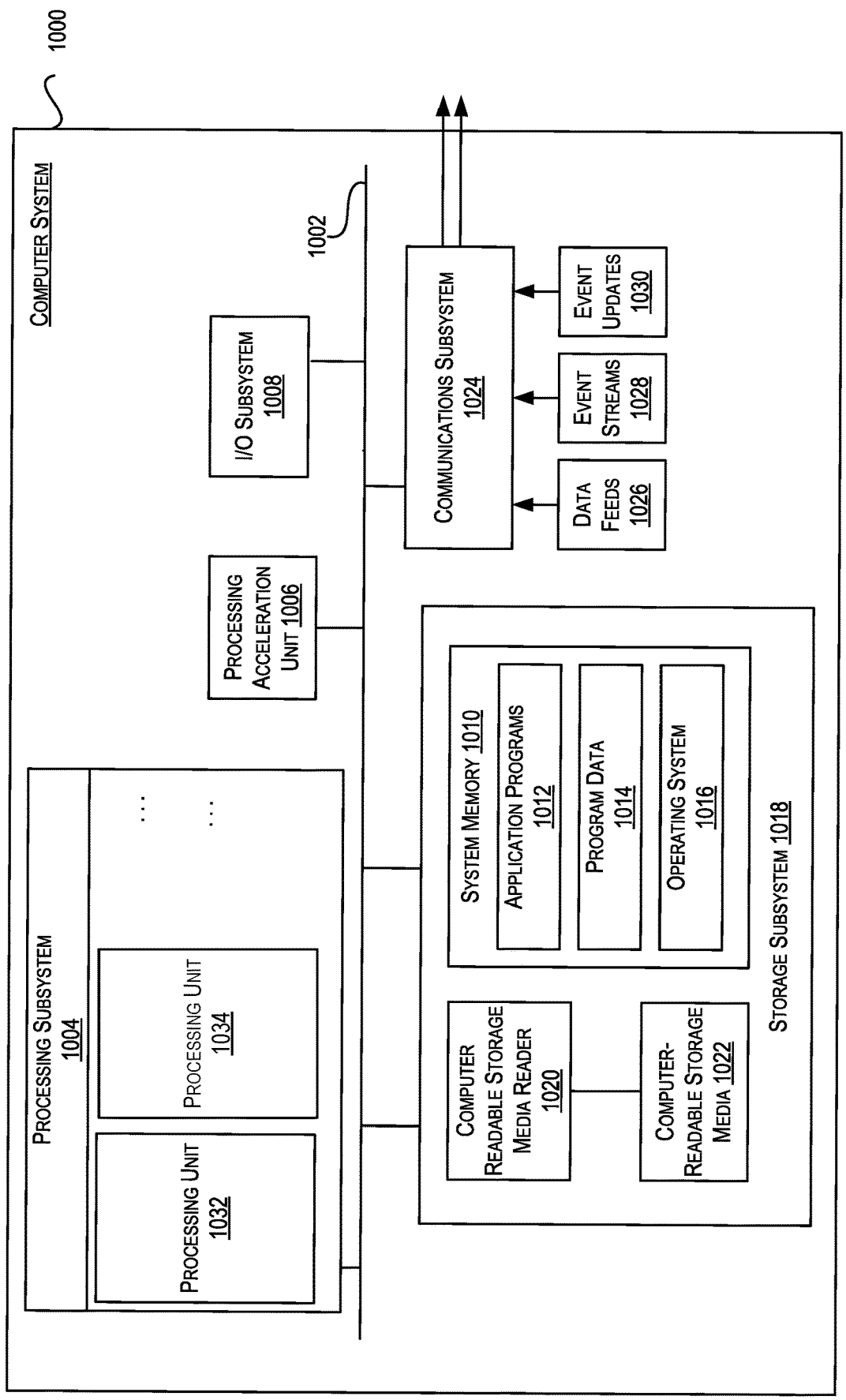
FIG. 10 illustrates an example computer system that may be used to implement certain aspects.

FIG. 10 illustrates an exemplary computer system 1000 that may be used to implement certain aspects. For example, in some aspects, computer system 1000 may be used to implement any of the system 400 for handling long text for pre-trained language models as shown in FIG. 4. and various servers and computer systems described above. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative aspects of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some aspects, processing subsystem 1004 can include one or more special purpose co-processors such as graphics processors, digital signal processors (DSPs), or the like. In some aspects, some or all of the processing units of processing subsystem 1004 can be implemented using customized circuits, such as application specific integrated circuits (ASICs), or field programmable gate arrays (FPGAs).

In some aspects, the processing units in processing subsystem 1004 can execute instructions stored in system memory 1010 or on computer readable storage media 1022. In various aspects, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain aspects, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some aspects. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some aspects. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, digital video disc (DVD), a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1018 may also include a computer-readable storage media reader 1020 that can further be connected to computer-readable storage media 1022. Reader 1020 may receive and be configured to read data from a memory device such as a disk, a flash drive, etc.

In certain aspects, computer system 1000 may support virtualization technologies, including but not limited to virtualization of processing and memory resources. For example, computer system 1000 may provide support for executing one or more virtual machines. In certain aspects, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, the communication subsystem may be used to transmit a response to a user regarding the inquiry for a Chabot.

Communication subsystem 1024 may support both wired and/or wireless communication protocols. For example, in certain aspects, communications subsystem 1024 may include radio frequency (RF) transceiver components for accessing wireless voice and/or data networks (e.g., using cellular telephone technology, advanced data network technology, such as 3G, 4 G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1024 can provide wired network connectivity (e.g., Ethernet) in addition to or instead of a wireless interface.

Communication subsystem 1024 can receive and transmit data in various forms. For example, in some aspects, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects will provide those skilled in the art with an enabling description for implementing various aspects. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method, comprising:
    generating a trained machine-learning model by:
        accessing a set of natural language utterances;
        determining a length of the set of natural language utterances;
        when the length of the set of natural language utterances exceeds a pre-determined threshold of token pieces:
            dividing the set of natural language utterances into a plurality of overlapping chunks of token pieces;
            assigning a label together with a confidence score for each token piece in a chunk;
            determining a final label and an associated confidence score for each chunk of the plurality of overlapping chunks of token pieces by merging two confidence scores, one from a first chunk and another from a second chunk;
            determining a final annotated label for the set of natural language utterances based at least on the final label and the associated confidence score for each chunk of the plurality of overlapping chunks of token pieces; and
            storing the final annotated label in a memory; and
        training a machine-learning model using the set of natural language utterances and the final annotated label, wherein training the machine-learning model results in the trained machine-learning model;
    accessing a natural language utterance comprising a plurality of tokens;
    using the trained machine-learning model to generate a labeled natural language utterance, wherein using the trained machine-learning model to generate the labeled natural language utterance comprises using the trained machine-learning model to label the plurality of tokens with a plurality of labels, wherein at least one label of the plurality of labels corresponds to a named entity class of a plurality of named entity classes; and
    storing the labeled natural language utterance.

2. The method of claim 1, wherein each chunk and its corresponding sequence of labels are treated as a separate example when training.

3. The method of claim 1, wherein the dividing the set of natural language utterances with a size N is broken into (N−L)/(K−L) overlapping chunks wherein K is a chunk size and L is an overlapping size.

4. The method of claim 1, wherein the determining an overall score and final annotated label of a token piece based at least in part on a confidence score from a first selected chunk of the plurality of overlapping chunks.

5. The method of claim 1, wherein the determining an overall score of a token piece is based on a position of the token piece in the plurality of overlapping chunks of token pieces, wherein the overall score is a first confidence score from the first chunk if it is in a first half of in the plurality of overlapping chunks of token pieces and a second confidence score from the second chunk if it is in a second half of the plurality of overlapping chunks of token pieces.

6. The method of claim 1, wherein the determining an overall score is based on a maximum confidence score of the plurality of overlapping chunks.

7. The method of claim 1, wherein the pre-determined threshold of token pieces is 512 tokens and a pre-determined number of overlapping token pieces is 128 tokens.

8. A system comprising:
one or more processors; and
a memory coupled to the one or more processors, the memory storing a plurality of instructions executable by the one or more processors, the plurality of instructions that when executed by the one or more processors cause the one or more processors to perform operations comprising:
generating a trained machine-learning model by:
accessing a set of natural language utterances;
determining a length of the set of natural language utterances;
when the length of the set of natural language utterances exceeds a pre-determined threshold of token pieces:
dividing the set of natural language utterances into a plurality of overlapping chunks of token pieces;
assigning a label together with a confidence score for each token piece in a chunk;
determining a final label and an associated confidence score for each chunk of the overlapping chunks of token pieces by merging two confidence scores, one from a first chunk and another from a second chunk;
determining a final annotated label for the set of natural language utterances based at least on the final label and the associated confidence score for each chunk of the plurality of overlapping chunks of token pieces; and
storing the final annotated label in a memory; and
training a machine-learning model using the set of natural language utterances and the final annotated label, wherein training the machine-learning model results in the trained machine-learning model:
accessing a natural language utterance comprising a plurality of tokens;
using the trained machine-learning model to generate a labeled natural language utterance, wherein using the trained machine-learning model to generate the labeled natural language utterance comprises using the trained machine-learning model to label the plurality of tokens with a plurality of labels, wherein at least one label of the plurality of labels corresponds to a named entity class of a plurality of named entity classes; and
storing the labeled natural language utterance.

9. The system of claim 8, wherein each chunk and its corresponding sequence of labels are treated as a separate example when training.

10. The system of claim 8, wherein the dividing the set of natural language utterances with a size N is broken into (N−L)/(K−L) overlapping chunks wherein K is a chunk size and L is an overlapping size.

11. The system of claim 8, wherein the determining an overall score and final annotated label of a token piece based at least in part on a confidence score from a first selected chunk of the plurality of overlapping chunks.

12. The system of claim 8, wherein the determining an overall score of a token piece is based on a position of the token piece in the overlapping chunks of token pieces, wherein the overall score is a first confidence score from the first chunk if it is in a first half of in the overlapping chunks of token pieces and a second confidence score from the second chunk if it is in a second half of the overlapping chunks of token pieces.

13. The system of claim 8, wherein the determining an overall score is based on a maximum confidence score of the plurality of overlapping chunks.

14. The system of claim 8, wherein the pre-determined threshold of token pieces is 512 tokens and a pre-determined number of overlapping token pieces is 128 tokens.

15. A non-transitory computer-readable medium storing a plurality of instructions executable by one or more processors that cause the one or more processors to perform operations comprising:
generating a trained machine-learning model by:
accessing a set of natural language utterances;
determining a length of the set of natural language utterances;
when the length of the set of natural language utterances exceeds a pre-determined threshold of token pieces:
dividing the set of natural language utterances into a plurality of overlapping chunks of token pieces;
assigning a label together with a confidence score for each token piece in a chunk;
determining a final label and an associated confidence score for each chunk of the overlapping chunks of token pieces by merging two confidence scores, one from a first chunk and another from a second chunk;
determining a final annotated label for the set of natural language utterances based at least on the final label and the associated confidence score for each chunk of the plurality of overlapping chunks of token pieces; and
storing the final annotated label in a memory; and
training a machine-learning mode using the set of natural language utterances and the final annotated label, wherein training the machine-learning model results in the trained machine-learning model;
accessing a natural language utterance comprising a plurality of tokens;
using the trained machine-learning model to generate a labeled natural language utterance, wherein using the trained machine-learning model to generate the labeled natural language utterance comprises using the trained machine-learning model to label the plurality of tokens with a plurality of labels, wherein at least one label of the plurality of labels corresponds to a named entity class of a plurality of named entity classes; and
storing the labeled natural language utterance.

16. The non-transitory computer-readable medium of claim 15, wherein each chunk and its corresponding sequence of labels are treated as a separate example when training.

17. The non-transitory computer-readable medium of claim 15, wherein the dividing the set of natural language utterances with a size N is broken into (N–L)/(K–L) overlapping chunks wherein K is a chunk size and L is an overlapping size.

18. The non-transitory computer-readable medium of claim 15, wherein the determining an overall score and final annotated label of a token piece based at least in part on a confidence score from a first selected chunk of the plurality of overlapping chunks.

19. The non-transitory computer-readable medium of claim 15, wherein the determining an overall score of a token piece is based on a position of the token piece in the overlapping chunks of token pieces, wherein the overall score is a first confidence score from the first chunk if it is in a first half of in the overlapping chunks of token pieces and a second confidence score from the second chunk if it is in a second half of the overlapping chunks of token pieces.

20. The non-transitory computer-readable medium of claim 15, wherein the determining an overall score is based on a maximum confidence score of the plurality of overlapping chunks.

\* \* \* \* \*

UNITED STATES PATENT AND TRADEMARK OFFICE
CERTIFICATE OF CORRECTION

PATENT NO. : 12,210,830 B2  
APPLICATION NO. : 17/750240  
DATED : January 28, 2025  
INVENTOR(S) : Vu et al.

Page 1 of 1

It is certified that error appears in the above-identified patent and that said Letters Patent is hereby corrected as shown below:

In the Specification

In Column 27, Line 49, delete "iPad®))," and insert -- iPad®), --, therefor.

In Column 36, Line 40, delete "4 G" and insert -- 4G --, therefor.

Signed and Sealed this  
Sixth Day of May, 2025

Coke Morgan Stewart  
*Acting Director of the United States Patent and Trademark Office*